United States Patent [19]

Moyer et al.

[11] 3,910,999

[45] Oct. 7, 1975

[54] OXIDATION OF MIXTURES OF ORGANIC COMPOUNDS WITH HYPOCHLORITE ION SOURCE MATERIALS

[75] Inventors: John R. Moyer; Charles S. Parmele, both of Midland, Mich.

[73] Assignee: The Dow Chemical Company, Midland, Mich.

[22] Filed: June 25, 1973

[21] Appl. No.: 373,069

[52] U.S. Cl.......... 260/531 R; 260/413; 260/527 R; 260/530 R; 260/540; 260/265.35 R
[51] Int. Cl.$^2$.................. C07C 51/26; C07C 51/16
[58] Field of Search .................. 260/531 R, 527 R

[56] References Cited
UNITED STATES PATENTS
3,649,493  10/1972  Meiners .......................... 204/157

Primary Examiner—James A. Patten
Assistant Examiner—Richard D. Kelly
Attorney, Agent, or Firm—Bruce M. Kanuch

[57] ABSTRACT

An aqueous mixture of pH from neutral to alkaline and temperature from 70°C. to about 100°C. containing different oxidizable organic species which are most favorably oxidized individually with hypochlorite ions at different pH values is contacted with a hypochlorite ion source for a sufficient period of time to oxidize a substantial portion of said organic species.

11 Claims, No Drawings

OXIDATION OF MIXTURES OF ORGANIC COMPOUNDS WITH HYPOCHLORITE ION SOURCE MATERIALS

BACKGROUND OF THE INVENTION

It is well-known that certain organic compounds containing hydroxyl and/or oxygen groups can be oxidized in an aqueous solution with chlorine or hypochlorite ions. It is also well-known that certain of these organic compounds are more readily oxidized under acidic conditions (e.g., polyhydric compounds), others are more readily oxidized under neutral conditions (e.g., hydroxy carboxylic compounds) and others are more readily oxidized under alkaline conditions (e.g., hydroxy ketones and aldehydes). In every case, the rate of oxidation of these organic compounds in aqueous solutions by hypochlorite ions or by $Cl_2$ is faster in hot solutions than in cold, and at higher concentrations of oxidant than at lower concentrations. Further, it is known in the art that $OCl^-$ ions are readily converted to non-oxidizing and in certain instances undesirable chlorate ions ($ClO_3^-$) at around neutral pH values (e.g., 6 to 8) and specifically within a pH range of from about 6.5 to 7 and that this disproportionation occurs much faster in hot solutions which contain a high concentration of $OCl^-$ ions.

Thus a problem confronting the art has been how to effectively and rapidly oxidize mixtures of organic species with $OCl^-$ ions wherein certain of the organic species are most readily oxidized at pH values which are acidic and others are more readily oxidized in neutral or alkaline environments without forming undesirable quantities of chlorate ions. To one skilled in the art the above known conditions suggest that a several stage process would be required with careful control of $OCl^-$ content and pH values so that there was substantially no $OCl^-$ present at a pH of, for example, from about 6 to 8. One method envisioned would be to first acidify the aqueous mixture to a pH value of about 4 and add just sufficient $Cl_2$ to oxidize the organic species which are better oxidized at acidic pH conditions. This first step would be allowed to go to completion so that substantially all the $Cl_2$ would be consumed. The pH of the solution would then be raised to an alkaline pH and additional $Cl_2$ would then be added to oxidize the organic species which oxidize more readily under these conditions. The organic species of particular concern during the subsequent oxidation step are those which formed during the initial oxidation step undergone at acidic pH values.

This multiple step procedure, however, has many drawbacks. First, at pH values of about 4 the solubility of $Cl_2$ in a hot aqueous solution is very low, e.g., from 50 to 100 ppm (parts per million) of solution. Therefore, process equipment must be employed to provide for scrubbing of large volumes of $Cl_2$ leaving the reaction system. Also, at least two reactor vessels would be required because the pH of the solution would need to be raised by the addition of, for example, NaOH to allow oxidation of the other organic compounds. Also, because of the limited solubility of $Cl_2$ in acidic aqueous solutions large reaction vessels would be required to permit reasonable reaction times.

An alternative solution to the problem of $NaClO_3$ formation is taught by Meiners et al. in U.S. Pat. No. 3,649,493. In the Meiners et al. process organics are oxidized in cold dilute solutions of $Cl_2$ or hypochlorous acid, accelerated by irradiation (i.e., ultraviolet light).

It has now been discovered that $OCl^-$ ions are not readily converted to $ClO_3^-$ ions at a pH of 6.5 to 7, even in hot solutions, if there are also present in the solution certain types of oxidizable organic compounds more fully defined hereinafter. It has been further discovered that it is feasible to use substantially higher temperatures and chlorine concentrations than Meiners, obviating the need for the economically inhibiting ultraviolet energy source. Surprisingly, at these high temperatures and chlorine concentrations, a relatively small amount, if any, of chlorate is formed and the organics are rapidly oxidized.

SUMMARY OF THE INVENTION

The method of the present invention comprises oxidizing, with a hypochlorite ion source at a temperature between about 70°C. and its boiling point, an aqueous mixture of organic compounds wherein at least one organic compound is most readily oxidized at acidic pH values and at least one compound is most readily oxidized at neutral or alkaline pH values. The initial pH of the aqueous mixture is neutral (7) or greater, preferably at an initial pH value ranging from about neutral (7) to 9. The organic compounds are characterized as being oxidizable with hypochlorite ions and containing an —OH, —Cl, —OM or =O group attached to a carbon atom wherein M is a metal cation.

DETAILED DESCRIPTION OF THE INVENTION

Organic compounds which can be oxidized according to the practice of the present invention, include those corresponding to the general formulas:

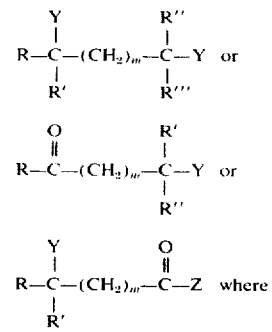

R, R', R'', and R''' = $C_nH_{2n+1}$ where n = 0 to 10, m = 0 to 3, Y = Cl or OH, and Z = H, OH, ONa, OMg, OCa, OK, or OAl. Included by way of example are glycols, hydroxy carboxylic acids, hydroxy ketones, chloro ketones, chloro organic acids, keto acids and 1,3-chloro alcohols. Specific compounds which are known to be more readily oxidized by hypochlorite ions in acidic conditions (pH of 6.5 or less) include, for example, glycols, 3-chloro-1-propanol, 3-chloro-1-butanol, and 4-chloro-2-butanol. Specific organic compounds which are known to be more readily oxidized with hypochlorite ions in neutral conditions (pH 7.5 to 6.5) include, for example, lactic acid and glycolic acid. Specific compounds which are known to be more readily oxidized with hypochlorite ions in a more alkaline environment (pH of 7.5 or greater) include, for example, acetone, chloroacetone, acetol and 1-hydroxy-2-butanone.

In the practice of the present invention the aqueous mixture having an initial pH of 7 or more, preferably from about 7 to 9, containing at least one organic compound which is more readily oxidized by hypochlorite ions in acidic conditions and at least one organic compound which is more readily oxidized at neutral or alkaline pH values, is contacted with a sufficient amount of a hypochlorite ion source at a temperature of about 70°C. to the boiling point of the aqueous mixture to effect oxidation of the organic species to their oxidized forms. The pH of the solution drops during the oxidation of the organic species because of the formation of acidic (HCl or an organic acid) species during the oxidation step. For example, propylene glycol is oxidized with hypochlorite ions to form an intermediate organic compound (acetol) and HCl thus lowering the pH of the reaction solution. Acetol is known to be more readily oxidized in alkaline environments, therefore, by initially conducting the oxidation step at neutral or alkaline conditions the oxidation rate of this organic compound is increased. However, as the oxidation reactions proceed, the reaction solution becomes sufficiently acidic to favor the oxidation of propylene glycol.

By practicing the present invention more species can be oxidized in a shorter period of time with less stringent and time consuming steps than if pH changes and separate hypochlorite ion source additions are made to favor each of the individual organic species present in the reaction mixture. This method is made possible by the discovery that $ClO_3^-$ ions are not produced in aqueous solutions having a pH range of from 6 to about 8 when certain types of oxidizable organic compounds, e.g., one or more compounds which are more readily oxidized under acid conditions and one or more compounds which are more readily oxidized under neutral or alkaline conditions, are present in the reaction mixture.

Hypochlorite ion sources which can be employed include chlorine, hypochlorite solutions such as solutions of hypochlorite salts, e.g., alkali and alkaline earth metal hypochlorites, e.g., sodium hypochlorite, calcium hypochlorite and the like. Chlorine gas is preferred because of its wide availability and low cost.

The amount of hypochlorite ion used should be within the range of stoichiometric equivalents required to oxidize the total organic species present. This range of amounts extends between the amount of hypochlorite ion stoichiometrically required to oxidize all of the organics at least to an oxidation state lower by one electron and the amount required to oxidize all of the organics present to $CO_2$ and water. Use of an amount of hypochlorite ion significantly greater than the upper limit of the stoichiometric range is avoided to prevent formation of chlorate ions.

In some situations, however, it is possible that so much organic is present that the stoichiometrically required amount of hypochlorite ion is not obtainable, e.g., if $Cl_2$ is the hypochlorite ion source, the $Cl_2$ solubility in the aqueous mixture may be less than the stoichiometrically required amount. With $Cl_2$ as the hypochlorite ion source, usually encountered mixtures of organics can be successfully treated with about 150 to about 1500 ppm of $Cl_2$ in solution.

The temperature of the aqueous mixture is in the range of about 70°C. to its boiling point. At temperatures below about 70°C. the oxidation proceeds too slowly to be economically feasible. The mixture is desired to remain in the liquid phase, so operation is practiced below the boiling point of the mixture. Such boiling point will usually fall within the range of 100°–110°C.

Operability in this temperature range is particularly useful when hot, organic-contaminated brines comprise the mixture to be treated. Such brines are obtained from, for example, various industrial processes at temperatures between 70°C. and 100°C. and can be treated directly by the method of this invention without any preheating.

As an example of the present invention, a mixture of organics, present in a brine solution obtained from an alkylene oxide process is oxidized in the following manner. For example, in the preparation of propylene oxide by hydrolysis of propylene chlorohydrin with caustic soda a residual waste stream containing NaOH, NaCl, propylene glycol, sodium lactate, acetol, and other organics is formed. In some instances it is desired to employ this waste stream in chlorine cells. However, propylene glycol and sodium lactate, and acetol to a lesser extent, are known to be harmful to chlorine cells. Also, chlorate ions are known to be harmful to chlorine cells. By the practice of the present invention the level of propylene glycol and sodium lactate can be readily reduced without the formation of chlorate ions.

The aqueous mixture from the propylene oxide process (which usually has a pH of about 10 to 13) is contacted in a suitable reactor with a sufficient quantity of hypochlorite ion source, e.g., $Cl_2$, at a temperature of from about 70°C. to the boiling point of the mixture to oxidize propylene glycol, sodium lactate and acetol. The first chlorine to enter the solution reacts rapidly with acetol and NaOH to form sodium acetate, NaCl and HCl. Because of the formation of HCl the pH of the reaction system also decreases. Continuing the oxidation until a pH of 7–9 is reached allows the oxidation of sodium lactate to begin. As the oxidation process is continued the pH of the solution decreases to below 7 and the rate of oxidation of propylene glycol is thus increased. In this particular example the quantity of acetol may actually be increased since it is one of the oxidation products of propylene glycol under acidic conditions, and, as pointed out hereinbefore, the oxidation of acetol to sodium acetate proceeds most rapidly in alkaline environments. The sodium lactate is oxidized to sodium acetate while a portion of the acetol derived from propylene glycol is also oxidized to sodium acetate.

Since one of the products of all of the aforementioned oxidation is HCl, the pH of the reaction solution is lowered as the process proceeds. To permit the oxidation of a desired quantity of organic species which are most readily oxidized at about neutral pH conditions, the pH of the reaction mixture can be controlled (e.g., by the addition of alkaline values) for a sufficient period of time to allow this reaction to proceed. For example, in order to assure oxidation of a substantial portion of the sodium lactate it is preferred to maintain the pH of the solution within the range of about 6 to 9 for a period of time sufficient to permit the oxidation of the lactate. The period of time required varies with the concentration of the lactate present and ease of hypochlorite oxidation of the organic compounds present, as well as the extent of oxidation desired. For example, solutions containing, inter alia, 940 ppm propylene glycol, 135 ppm sodium acetate, and 347 ppm sodium lactate was oxidized to substantially completely remove propylene glycol and sodium lactate in time periods between about 10 and 35 minutes, see Example 3. The pH can be controlled by regulating the amount of hypochlorite ion source, the amount of alkaline brine solution added, or by other similar procedures.

After the organic species which are most favorably oxidized in neutral to alkaline pH environments are oxidized, the pH of the mixture is allowed to decrease (either by the generation of HCl and/or by the addition of acidic materials) to favor the oxidation of propylene glycol. Substantially complete oxidation of the propylene glycol species can be achieved if desired. Surprisingly, however, even though the pH of the solution passes through the range of 8 to 6 (where the formation of chlorate ions was expected) substantially no chlorates were formed.

Other aqueous solutions containing a variety of oxidizable organic species as defined hereinbefore can be treated in a similar manner.

The above described process may be carried out in a batch or continuous method. For example, $Cl_2$ can be bubbled through an aqueous solution containing oxidizable organic species suspended in or flowing through a suitable reaction zone. The flow rate is adjusted to permit the oxidation of the desired amount of the organic species. The pH of the aqueous solution in the reaction zone can be controlled by one or more techniques such as by adding acid thereto, controlling the flow of basic brine solution thereto and or by controlling the rate of introduction of chlorine (or other hypochlorite ion source) into the solution. For example, a pair of pH electrodes can be provided at a point downstream of the contacting zone. An amplifier and a controller are attached to the electrodes. When the pH rises above an allowable value, e.g., 8, the rate of hypochlorite ion source supply, e.g., the chlorine gas flow rate, is increased. If the pH of the contacting zone drops below an allowable value, e.g., 7, the rate of chlorine supply is decreased. If the alkalinity in the source waste stream rises above about 0.20% NaOH, an acid, e.g., HCl, may have to be added before $Cl_2$ is added.

In one embodiment of the present invention an aqueous stream containing an aforedescribed combination of oxidizable organic species and chlorine gas is fed into and through a gas-liquid contactor. The resulting reaction mixture is then fed to a holding tower and the reaction is permitted to proceed until the desired degree of oxidation is achieved. The residence reaction time will depend on such factors as original pH, temperature of the reaction mixture and the like. 7

The rate of oxidation and the quantity of organics oxidized are dependent on such factors as the temperature of the reaction mixture during oxidation, the time the reaction is allowed to proceed, pH value of the original reaction mixture, the specific organics present in the reaction mixture and other similar parameters. These parameters can be readily determined for any specific reaction mixture. The specific working examples set forth hereinafter illustrate the effect that these parameters can have on the oxidation process. As indicated hereinbefore the process should preferably be carried out with a reaction mixture having an initial pH of 7 or more at a temperature of from 70° to 100°C.

EXAMPLE 1

Effluent brine having a pH of about 12 obtained as a waste stream from a propylene oxide process via a chlorohydrin intermediate was introduced into an unpacked chlorination tower. This tower comprised a vertical glass column 7 feet tall constructed of 1 inch inside diameter glass tubing. Chlorine was introduced through a fritted glass sparger in the bottom of the tower. The brine, heated to 94°C., was also introduced through the bottom of the column. The reaction mixture of gases and liquid was conducted from the unpacked chlorination tower into a second unpacked tower, 3 feet high and 3 inches inside diameter, standing in a vertical position. The reaction mixture was then conducted through a small vessel containing pH and chlorine-sensing electrodes before discharge from the apparatus. The rate of addition of chlorine was adjusted to give 200-300 ppm at the location of the chlorine sensing electrodes. The alkalinity of the feed was first adjusted by addition of concentrated HCl so that the pH of the brine was lowered to about 11. The effluent from the process had a pH ranging from about 2 to 3.

The waste brine was introduced into the first column at the rate of 375 cc/minute. This gave a residence time in the apparatus of 15.5 minutes. Approximately 50 gallons of brine was processed. The initial and final composition of the brine is given in Table I below.

TABLE I

| Compound | Concentration in ppm | |
|---|---|---|
| | Initial | Final |
| propylene glycol | 377 | 30 |
| acetol | 100 | 100 |
| sodium lactate | 240 | <25 |
| sodium acetate | 99 | 406 |
| sodium chlorate | 124 | 195 |

It is seen that the concentrations of the organic compounds propylene glycol and sodium lactate were substantially reduced and the concentration of sodium acetate, an oxidation product, substantially increased.

Because the final pH of the reaction mixture was in the range between about 2 to 4, the amount of acetol (which is more readily oxidized under alkaline conditions) was unchanged. This example also shows that even though the pH of the hot reaction mixture changed from 11 to about 2 with excess $Cl_2$ present at all times substantially no chlorate ion was formed.

EXAMPLE 2

In this example samples of a waste stream from a propylene oxide process were mixed with $Cl_2$ under pressure and reacted for different periods of time by controlling the flow rate of a stream through a reactor to provide different residence times (i.e., reaction times). The samples each contained soluble alkaline values of 0.038 mole NaOH/liter. $Cl_2$ was provided in an amount equal to 0.056 mole $Cl_2$/liter of the waste stream. The residence times, content of organics in the original waste stream and in the effluent, and the pH of the effluent from the process are set forth in the following Table II. The temperatures of the effluents were the same as the temperatures of the respective samples of original waste stream, the process operates isothermally.

TABLE II

|  | Feed Brine | Effluents - Test Nos. 1 | 2 | 3 | 4 | 5 |
|---|---|---|---|---|---|---|
| Residence Time minutes | — | 17.0 | 19.6 | 24.0 | 13.6 | 11.8 |
| pH | — | 2.8 | 2.5 | 2.9 | 2.7 | 2.7 |
| Temperature °C. | 82–95 | 82–88 | 84–87 | 82–84 | 90–92 | 90–95 |
| Propylene Glycol ppm (parts per million) | 940 | 50–60 | 10 | 26 | 85 | 143 |
| Sodium Acetate, ppm | 135 | 681 | 741 | 693 | 658 | 573 |
| Sodium Lactate, ppm | 347 | <60 | <60 | <30 | <40 | <20 |
| Acetol, ppm | <10 | * | * | 49 | 292 | 33 |
| $NaClO_3$, ppm | 23 | * | 19 | 31 | 43 | 23 |

*Not analyzed for

EXAMPLE 3

In this example the effect of the feed alkalinity of the initial reaction mixture and residence time on the oxidation of organic species was determined. The tests were run as set forth in Example 1 and the alkalinity of the initial reaction mixture was controlled by adding NaOH thereto. $Cl_2$ was employed in an amount equal to 0.056 mole/liter of brine. The results of these tests are set forth in the following Tables III, IV and V.

TABLE III

|  | Feed Brine | Effluents - Test Nos. 1 | 2 | 3 |
|---|---|---|---|---|
| Residence time (minutes) | — | 16.8 | 31.6 | 23 |
| Feed alkalinity moles NaOH/liter | 0.076 | — | — | — |
| pH | 12.88 | 3.25 | 3.0 | 2.9 |
| Temp. °C. | 73–91 | 87–91 | 73–82 | 81–87 |
| Propylene glycol, ppm | 940 | <30 | <35 | <40 |
| Sodium acetate, ppm | 135 | 836 | 785 | 910 |
| Sodium lactate, ppm | 347 | 20 | 20 | 20 |
| Acetol, ppm | <10 | 241 | 104 | 83 |
| $NaClO_3$, ppm | 23 | 7 | 19 | 4 |

TABLE IV

|  | Feed Brine | Effluent |
|---|---|---|
| Residence time | — | 14 |
| Feed alkalinity moles NaOH/liter | 0.100 | — |
| pH | 13.0 | 3.9 |
| Temp. °C. | 90–94 | 90–94 |
| Propylene glycol, ppm | 940 | 0 |
| Sodium acetate, ppm | 135 | 823 |
| Sodium lactate, ppm | 347 | 0 |
| Acetol, ppm | <10 | 332 |
| $NaClO_3$, ppm | 23 | 43 |

TABLE V

|  | Feed Brine | Effluent |
|---|---|---|
| Residence time | — | 12.3 |
| Feed alkalinity moles NaOH/liter | 0.0035 | — |
| pH | 11.5 | 2.9 |
| Temp. °C. | 91–93 | 91–93 |
| Propylene glycol, ppm | 940 | 158 |
| Sodium acetate, ppm | 135 | 408 |
| Sodium lactate, ppm | 347 | 112 |
| Acetol, ppm | <10 | 61 |
| $NaClO_3$, ppm | 23 | 47 |

When the feed alkalinity was increased the amount of acetic acid produced was increased. At the 0.100 mole/liter of NaOH concentration and 14 minutes residence time the levels of the propylene glycol and sodium lactate in the effluent were about equal to the levels obtained in the tests run in Example 1 with 0.038 mole NaOH/liter brine and about 19.6 minutes residence time.

At the very low level of alkalinity, 0.0035 mole NaOH/liter, the conversion to acetic acid (sodium acetate) was significantly lower than at higher levels of feed alkalinity. This indicates that the hydrolysis of $Cl_2$ lowered the pH so quickly at the lower alkalinity that the oxidation of sodium lactate (which is preferably oxidized in a neutral environment) was slowed down.

At the longer residence times (Table I:24 minutes; and Table II:31.6 minutes) the conversion to acetic acid or sodium acetate decreased. At the slower flow rates heat losses were greater and consequently the oxidation of propylene glycol was slower.

What is claimed is:

1. A method of treating an aqueous mixture of pH of about neutral or greater containing a mixture of different organic compounds, wherein the organic compounds are selected from the group consisting of

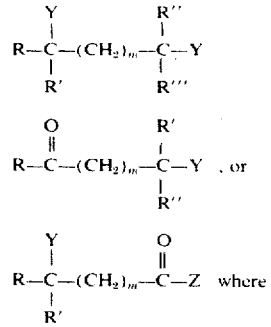

R, R', R'', R''' = $C_nH_{2n+1}$ where n = 0 to 10, m = 0 to 3, Y = Cl or OH, and Z = H, OH, ONa, OMg, OCa, OK, or OAl, at least one of which compounds is most favorably oxidized individually with hypochlorite ions at acidic pH values, and at least one other of which compounds is most favorably oxidized individually with hypochlorite ions at neutral to alkaline pH values, comprising oxidizing a substantial portion of said organics with hypochlorite ions at a temperature between about 70°C and the boiling point of the mixture to form a sufficient amount of acidic byproducts to drive the pH of said aqueous mixture below neutral.

2. The method of claim 1 wherein the initial pH of the mixture is between about 10 and about 13.

3. A method of oxidizing organic compounds in an aqueous mixture, wherein the organic compounds are selected from the group consisting of

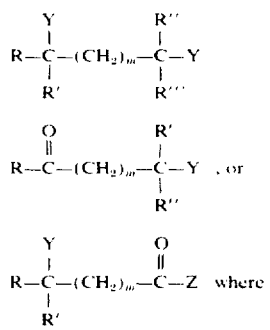

R, R', R'', R''' = $C_nH_{2n+1}$ where n = 0 to 10, m = 0 to 3, Y = Cl or OH, and Z = H, OH, ONa, OMg, OCa, OK, or OAl, said aqueous mixture containing different organic compounds which are readily oxidized with hypochlorite ions at different pH values ranging from acidic to alkaline, at least one of said organic compounds characterized as being more readily oxidized in an aqueous mixture having a pH of neutral or greater, wherein a sufficient amount of acidic byproducts is formed to drive the pH of said aqueous mixture below neutral, which comprises:

a. contacting said aqueous mixture at an initial pH of neutral or greater with a hypochlorite ion source;
b. continuing said contacting for a sufficient period of time and permitting the pH of the mixture to decrease during said time period to a value of less than 7, to oxidize a substantial quantity of said organic compounds, and
c. maintaining said aqueous mixture within a temperature range of from about 70°C to the boiling point of said aqueous mixture during the period of time said aqueous mixture is being contacted with said hypochlorite ion source.

4. The method defined in claim 3 including the step of controlling the pH value within certain selected pH ranges during said contacting, said pH ranges being those which are most favorable to the oxidation of certain of said organic species, said control being maintained for a period of time sufficient to permit the substantial oxidation of the organic species which is most readily oxidized in that pH range, and permitting the pH to decrease following the control of the pH to within said selected range.

5. The method of claim 3 wherein the contacting is carried on for a period of time between about 10 and about 45 minutes.

6. The method of claim 3 wherein the hypochlorite ion source is added in an amount within the stoichiometric range of that required to oxidize all of the organic compounds present.

7. The method of claim 3 wherein the hypochlorite ion source is $Cl_2$ supplied in a concentration of about 150 to about 1500 parts per million.

8. A method of oxidizing organic compounds selected from the group consisting of

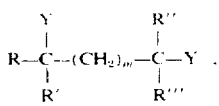

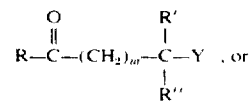

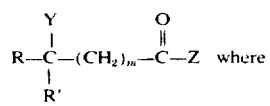

R, R', R'', R''' = $C_nH_{2n+1}$ where n = 0 to 10, m = 0 to 3, Y = Cl or OH, and Z = H, OH, ONa, OMg, OCa, OK, or OAl, with hypochlorite ions, which compounds are present in an aqueous mixture at a temperature between about 70°C and the boiling point of the solution and having an initial pH of neutral or greater, which comprises:

a. providing in the aqueous mixture two or more organic compounds, at least one of which is more readily oxidized in acidic conditions and at least one of which is more readily oxidized in neutral to alkaline conditions,
b. adding an amount of a hypochlorite ion source within the range stoichiometrically required to oxidize all of the organic compounds present, and
c. controlling the pH of the solution within a range and for a period of time sufficient to oxidize a substantial portion of the organic compounds present.

9. A method of oxidizing with hypochlorite ions an aqueous mixture of two or more organic compounds present in an aqueous mixture at temperatures between about 70°C. and the boiling point of the aqueous mixture and having an initial pH of neutral or greater, one of which compounds is selected from the group consisting of glycols, 3-chloro-1-propanol, 3-chloro-1-butanol, and 4-chloro-2-butanol and another of which is selected from the group consisting of lactic acid, glycolic acid, acetone, chloroacetone, acetol, and 1-hydroxy 2-butanone, which comprises:

a. adding to the aqueous mixture an amount of a hypochlorite ion source within the stoichiometric range of that required to oxidize all of the organic compounds present, and
b. controlling the pH of the aqueous mixture by adding acidic or alkaline values so that the pH gradually decreases to about 2 over a period of about 10 to about 45 minutes.

10. The method of claim 9 wherein the hypochlorite ion source is $Cl_2$ supplied in a concentration of about 150 to 1500 parts per million of the aqueous mixture.

11. The method of claim 9 wherein the aqueous mixture additionally contains an amount of sodium lactate and which method includes the step of adding acidic or alkaline values to maintain the pH of the aqueous mixture within the range of about 6 to about 9 for a period of time sufficient to oxidize at least a substantial portion of the sodium lactate present, which step is performed after the addition of the hypochlorite ion source and before the gradual pH decrease to about 2.

\* \* \* \* \*